(No Model.)

D. A. LEONARD.
NUT LOCK.

No. 504,596.          Patented Sept. 5, 1893.

Witnesses
Chas. S. Hoyer

Inventor
David A. Leonard
By John Wedderburn
Attorney

UNITED STATES PATENT OFFICE.

DAVID A. LEONARD, OF SHANNON, ILLINOIS.

NUT-LOCK.

SPECIFICATION forming part of Letters Patent No. 504,596, dated September 5, 1893.

Application filed June 15, 1893. Serial No. 477,629. (No model.)

*To all whom it may concern:*

Be it known that I, DAVID A. LEONARD, a citizen of the United States, residing at Shannon, in the county of Carroll and State of Illinois, have invented certain new and useful Improvements in Nut-Locks; and I do hereby declare the following to be a full, clear, and exact description of the invention, such as will enable others skilled in the art to which it appertains to make and use the same.

This invention relates to nut locks, and has for its object to increase the efficiency of such class of devices, and the convenience of application of the same, the parts being simple in their nature, and therefore comparatively inexpensive in manufacture.

With these and other objects in view, the invention consists of the construction and arrangement of the parts as will be more fully hereinafter described and claimed.

Figure 1:
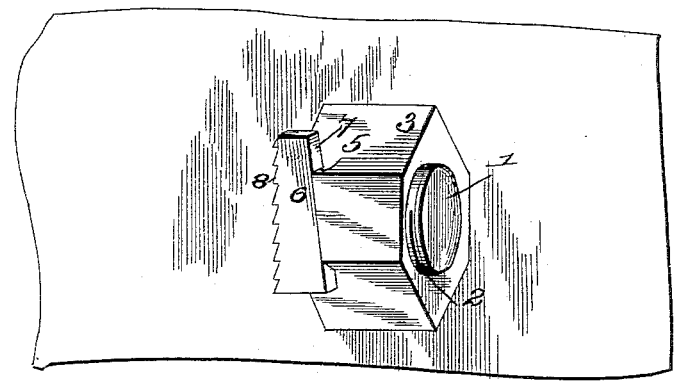
Figure 2:
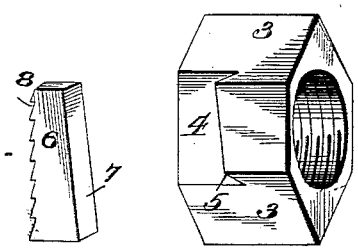

In the drawings: Figure 1 is a perspective view of a bolt in holding position, showing a nut with the improved lock in connection therewith. Fig. 2 is a detail perspective view of the nut and locking wedge or key, separated from each other.

Similar numerals of reference are employed to designate corresponding parts in both the figures.

Referring to the drawings, the numeral 1, designates a bolt provided with the ordinary screw threads 2, which are adapted to receive a nut or burr, 3, having corresponding threads, as will be readily understood.

The nut or burr, 3, has a slot, 4, in one or more sides adjacent to the bearing face of the same, the said slot being wider at one end than the other, in the form of a bevel and also provided with an over-projecting shoulder or flange, 5, whose under side is beveled. The slot, 4, is adapted to receive a wedge or key, 6, which is wider at one end than the other and has an outer beveled edge, 7, and an inner serrated edge, 8. This wedge or key is made of a small piece of steel of suitable dimension to suit the purpose of application and the size of the nut or burr, 3, and, when applied, it is slipped half way into the slot, 4, with the beveled edge, 7, held under the over-projecting shoulder or flange, 5, and, to complete the insertion of the said wedge, it is then driven home with a suitable tool. When the wedge is in position the serrated edge, 8, thereof bears against the surface against which the nut or burr, 3, may be applied, and, whether said surface be of metal or wood, the serrations prevent the said nut or burr from turning or becoming loose on the bolt. It will be seen that when the wedge is in position it cannot readily become disengaged, as the serrations thereof will prevent the same from slipping, while at the same time a durable lock is provided.

By the use of the form of key herein set forth, a washer is dispensed with, as it will be seen that the action of driving the wedge into the slot, 4, by force, will cause a stiff pressure between the serrated edge of the wedge and the surface against which the nut or burr may rest, thereby tending to force the nut outwardly on the bolt, and, at the same time, prevent its turning. It will be understood that the nut or burr need not be drawn tight, but just enough so that all parts are up close. To remove the burr or nut, turn the same forward about a quarter turn and the wedge will drop out or become loose enough to remove with the fingers. It is impossible to drive the wedge out with a hammer or any other tool.

The device is exceptionally simple, and consequently cheap in its manufacture, and it will be readily understood that slight changes in the minor details and proportions, so far as they may lie within the scope of the invention, may be made and substituted for those shown and described, without in the least departing from the nature or spirit of the invention.

Having thus described the invention, what is claimed as new is—

In a nut-lock, the combination with a bolt, of a nut or burr having a slot in one side thereof, that is wider at one end than at the other, and provided with an outer over-projecting shoulder or flange having an under beveled side, and a wedge or key of the same form as the said slot, and having an outer beveled edge and an inner serrated edge, said wedge or key being inserted in the said slot and driven home, substantially as described.

In testimony whereof I have signed this specification in the presence of two subscribing witnesses.

DAVID A. LEONARD.

Witnesses:
RUFUS M. COOK,
GEO. T. SHERWOOD.